Sept. 5, 1967  W. S. SMERDON  3,339,456
AIRCRAFT BOMBSIGHTS
Filed Nov. 9, 1964  2 Sheets-Sheet 1

Inventor
W. S. SMERDON
By
Cameron, Kerkam & Sutton
Attorneys

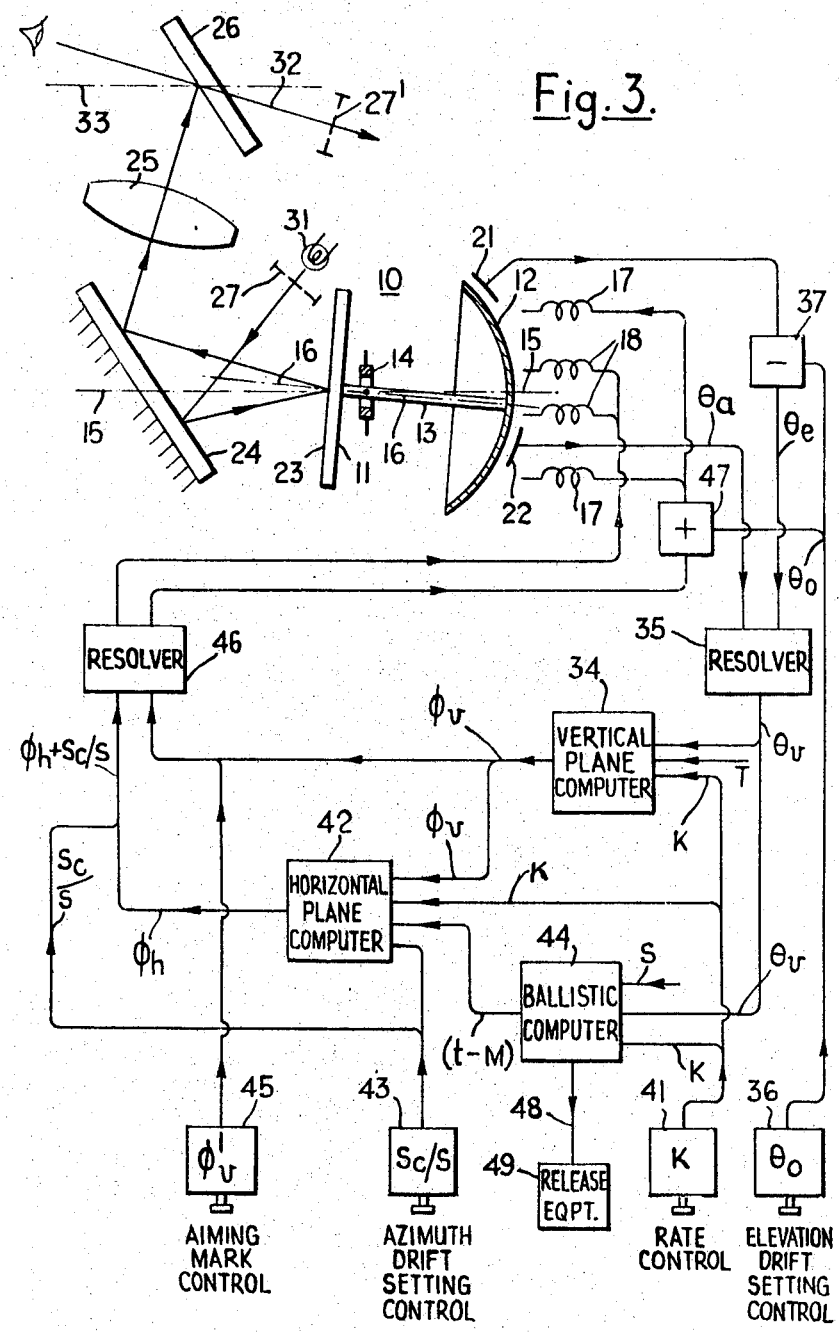

United States Patent Office 3,339,456
Patented Sept. 5, 1967

3,339,456
AIRCRAFT BOMBSIGHTS
William Stuart Smerdon, Edinburgh, Scotland, assignor to Ferranti, Limited, Hollinwood, Lancashire, England, a company of Great Britain and Northern Ireland
Filed Nov. 9, 1964, Ser. No. 410,020
Claims priority, application Great Britain, Nov. 9, 1963, 44,322/63
3 Claims. (Cl. 89—1.5)

This invention relates to aircraft bombsights, an object being to provide such a bombsight which, in particular, is suitable for low-level forms of attack, including attacks from extreme low-level with retarded bombs.

In accordance with the present invention, an aircraft bombsight includes a sighting head for viewing the ground ahead of the craft against a head-up aiming mark which defines a sight line, mark-precessing means operative as the craft approaches a target for automatically and continuously precessing the aiming mark to rotate the sight line with respect to the flight line of the craft so that in each of the horizontal and vertical planes which contain the flight line the ratio of the angular velocity of the component of the sight line resolved in that plane to the square of the sine of the angle between that component and the flight line is controllable, mark-stabilising means to facilitate the control of each of said ratios to stabilise the aiming mark on a fixed point on the ground ahead of the craft whilst the craft is flying a substantially straight course substantially parallel to the ground, mark-transferring means for transferring the aiming mark when so stabilised to cause the mark to coincide with the target, on which the mark remains stabilised, measuring apparatus for continuously deriving a smooth measured quantity dependent on said angle between the flight line and said component of the sight line resolved in the vertical plane, a ballistics computer for deriving the critical value of said quantity corresponding to the correct instant for releasing the bomb to hit the target whilst the craft is flying with the aiming mark stabilised on the target, and release equipment arranged to supply a signal to release the bomb when the measured value of said quantity reaches the computed critical value.

Figure 1:
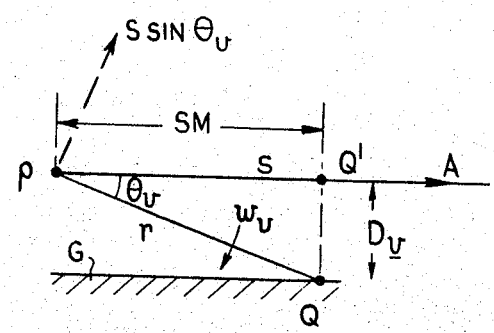
Figure 2:
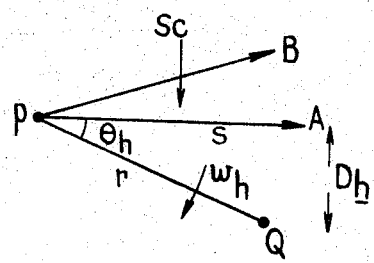

In the accompanying drawings,

FIGURES 1 and 2 are geometrical diagrams to explain the principle of operation of the invention, and FIGURE 3 is a diagram, mainly in block form, of one embodiment of the invention.

The principle of operation of the invention will first be explained with reference to FIGS. 1 and 2 in which it is assumed for convenience that the aircraft is flying on a course parallel to the ground. FIG. 1 shows an attack resolved in the vertical plane containing the flight line. In this diagram, P represents the position of an aircraft flying at a ground speed S on a course PA parallel to the ground G towards a fixed point Q on the ground in the same vertical plane. At the moment depicted, the range to point Q is $r$ and the depressed angle between the velocity rector PA and the sight line PQ is $\theta_v$, the suffix $v$ denoting the vertical plane of reference. The pass distance—that is, the height at which the craft will pass over Q under these conditions—is $D_v$. If $w_v$ is the angular velocity of the sight line in the vertical plane, it is clear from the geometry of the figure that $$rw_v = S \sin \theta_v \quad (1)$$

Hence $w_v = (S/r) \sin \theta_v$; and as $1/r = \sin \theta_v / D_v$, we can write $$w_v = (S/D_v) \sin^2 \theta_v \quad (2)$$

or $$w_v = SD_v/r^2 \quad (3)$$

If therefore there is no cross wind and arrangements are made for an aiming mark in a sighting head of the craft to be continuously lowered so that the sight line which it defines has an angular velocity $K \sin^2 \theta_v$, where K is manually adjustable and $\theta_v$ is the angle (defined above) between the sight line and the velocity vector (or flight line), the value of K may be controlled by the pilot so as to be equal to $S/D_v$, thereby causing the aiming mark to remain on the point Q as the aircraft continues to approach it. Under such conditions the mark may be described as being ground stabilised, or stabilised, on the point Q. Provided that the relationship prescribed by Equation 2 subsists, the aiming mark may be directed to any visible point on the ground ahead of the craft and will remain stabilised on it whatever the instantaneous value of $\theta_v$.

Thus for a level attack at a constant ground speed at a constant height over flat ground, the term K can be adjusted by the pilot to stabilise the aiming mark on some visible fixed point on the ground even before the target itself is visible. As soon as the target comes into view the pilot can raise the aiming mark (whilst keeping K at its previous value) onto the target, on which the mark will remain stabilised whilst the attack progresses.

From such factors as the ground velocity S and the angular velocity $w_v$ of the sight line stabilised on the target, a critical value of the angle $\theta_v$ may be readily computed using analogue techniques to indicate the instant at which a bomb released from the craft will hit the target.

As the bomb may be deliberately given high drag properties, it is necessary to consider also the geometry of the attack resolved on a horizontal plane when the attack is delivered in a wind having a component across the track. This is because the bomb drag due to the wind resistance delays the fall of the bomb so that the time $t$ it takes to reach the target is longer than the time M taken by the aircraft to reach the pass point $Q^1$ immediately above the target Q—see FIG. 1—after the bomb release. The bomb is therefore subjected to the cross wind longer than the craft to the extent of the time $(t-M)$, and during that extra time the bomb is deflected laterally off the aircraft's ground course to an extent $S_c(t-M)$, where $S_c$ is the velocity (speed) of the cross component of the wind. The aircraft must therefore be flown to pass at that distance on the windward side of the target to allow for this lateral drift of the bomb. Thus, in FIG. 2, which shows that attack in plan, PA again represents the course flown relative to the ground with S and $r$ the ground speed and the range to the point Q as before. These last two terms have now their respective projected values, but these will normally be little different from their actual values. The air course taken by the craft is in the direction PB, with the wind blowing with the cross velocity $S_c$ in the direction normal to the ground track.

The geometry is therefore generally similar to that of FIG. 1, with $\theta_h$ and $w_h$ in place of $\theta_v$ and $w_v$, giving the two further equations $$w_h = (S/D_h) \sin^2 \theta_h \quad (4)$$

or $$w_h = SD_h/r^2 \quad (5)$$

The horizontal pass distance $D_h$ is as stated above, namely $$D_h = S_c(t-M) \quad (6)$$

Various arrangements are practicable for controlling a sight line in obedience to these equations. A particularly suitable device, since it provides in addition space smoothing of the movement of the aiming mark, is an eddy-current or rate gyro. As described in more detail below, such a gyro includes as part of the rotor an electrically conductive member, usually shaped as a dome, in which eddy currents are generated by means of coils fixed to the gyro frame and defining orthogonal planes, which for the moment will be assumed to be the vertical and the horizontal. By differentially energising opposite pairs of these coils it is possible to apply eddy-current drag to the dome to cause the gyro to precess and so rotate its spin axis in those planes with respect to a datum line of the gyro frame. When the coils of one pair are differentially energised to rotate the spin axis in one of these planes, the gyro precesses in accordance with a law of the form $w=a/T$, where $w$ is the angular velocity of the spin axis with respect to the datum line, $a$ is the angle between the spin axis and the centre of the magnetic field set up by those coils, and T is the time constant of the gyro—that is, the constant of proportionality relating the angular velocity of the gyro axis to the angle between it and the field centre.

Assuming this plane is the vertical plane and the gyro controls the aiming mark so that the spin axis always coincides with the sight line, we can write for $a$, $\phi_v - \theta_v$, where $\phi_v$ is the angle between the field centre and the flight line of the craft and $\theta_v$ has the value given above. Thus we have:

$$w_v = (\phi_v - \theta_v)/T \quad (7)$$

For the gyro to operate so as to obey Equation 2, $w_v$ should be replaced by the right-hand term of the equation, from which we get:

$$\phi_v = \theta_v + KT \sin^2 \theta_v \quad (8)$$

where K represents, as before, the rate-control term $S/D_v$.

Thus by energising the appropriate coils of the field system by a signal $\phi_v$ proportional to this value of $\phi_v$, with a signal $\theta_v$ proportional to $\theta_v$ derived from the gyro itself by some convenient form of pick-off, the gyro may be constrained to lower the aiming mark continuously in accordance with Equation 2, stabilising the mark on the ground ahead provided that K has the value appropriate to the speed S and height $D_v$ of the aircraft. By making K manually adjustable by the pilot, he can thereby adjust the signal $\phi_v$ to stabilise the aiming mark on any conveniently identifiable object on the ground ahead without needing to know the actual value of the speed and height. If, further, facilities are provided to enable him to adjust the instantaneous value of signal $\theta_v$, whilst maintaining K thus preset, he can raise the mark to a more distant object, such as the target, on which the mark will also remain stabilised.

Similar considerations apply to the horizontal plane where the attack is launched in a cross wind. Here a signal $\phi_h$ for energising the field coils controlling the position of the spin axis in the horizontal plane may be derived in a similar form to that of Equation 8. It is however more convenient to derive the signal $\phi_h$ from the signal $\phi_v$ and from other factors that are readily available. Such an equation may be obtained as follows.

The gyro characteristic in the horizontal plane resembles that of Equation 7:

$$w_h = (\phi_h - \theta_h)T, \text{ or } \phi_h = \theta_h + Tw_h \quad (9)$$

By combining Equation 1 with the corresponding equation for the horizontal plane and in each case replacing the sine term by the angle itself, which results in negligible error in most practicable forms of attack, we get $w_v/w_h = \theta_v/\theta_h$. Similarly from Equations 3 and 5: $w_v/w_h = D_v/D_h$. Hence for $\theta_h$ in Equation 9 we can write $D_h\theta_v/D_v$, and replace $w_h$ by $D_h w_v/D_v$. Equation 9 thus becomes:

$$\phi_h = (D_h/D_v)(\theta_v + Tw_v) = D_h\phi_v/\phi_v, \text{ (from Equation 7)}$$

Replacing $D_h$ by $S_c(t-M)$, (from Equation 6), and $D_v$ by $S/K$:

$$\phi_h = (S_c/S)K(t-M)\phi_v \quad (10)$$

As $\phi_h$ is measured from the flight line whereas the aircraft must head into the wind at an angle $S_c/S$ to maintain that flight line, the term $S_c/S$ must be added to $\phi_h$ to correct for wind drift.

Thus if signals proportional to $\phi_v$ and $\phi_h$ (the latter corrected for wind drift and both resolved into the planes of elevation and azimuth) are applied to the field system of the gyro the aiming mark may be stabilized on a point ahead of the craft offset from the course to an extent proportional to the cross-wind speed.

The signal $\theta_v$, required to compute the bomb-release point, is derived from the gyro pick-offs.

A particular embodiment of the invention in which the aiming mark is controlled by a gyro in this manner will now be described with reference to FIG. 3.

With the sighting head in an eddy-current gyro 10 of the kind broadly described above and similar to the kind shown in FIG. 2 of British patent specification No. 578,958 (U.S. Patent No. 2,527,245). Briefly, the apparatus comprises a gyro rotor having a weighted gyro wheel 11 and a spherical dome 12 of electrically conductive material such as aluminium secured to a common spindle 13 carried by a Hooke's joint 14; the centre of curvature of the dome coincides with the centre of the joint. The means for driving the rotor are not shown; a convenient arrangement is an electrical motor fixed to the frame of the gyro and driving the rotor through the Hooke's joint.

The dome 12 passes through airgaps in a magnetic system defining the orthogonal planes above referred to. Each plane contains the datum line 15 of the apparatus; this line is coincident with the fore-and-aft line of the craft, and is such as also to be coincident with the spin axis when the field system is symmetrically energised in both planes, the field centre being then on the datum line. As the gyro is subjected to the roll of the aircraft, the planes defined by the field system are more accurately the elevation and azimuth planes, rather than the vertical an horizontal planes. The terms "elevation" and "azimuth," as used throughout this specification, should be understood as referring to the pitch plane (or plane of symmetry) of the craft and the plane which is normal to that plane, the two planes intersecting along the datum line above mentioned. The coils associated with the precessional movement of the spin axis in those planes are usually described as the elevation and azimuth trail coils, represented on the drawing at 17 and 18 respectively. Thus by differentially energising the elevation coils 17 the field centre is displaced from the datum line, thereby applying eddy-current drag to cause the spin axis 16 to rotate in the plane of elevation. Similarly the differential energisation of the azimuth trail coils 18 causes the spin axis to rotate in the azimuth plane. Usually both sets of coils are energised, so that the movement of the spin axis and hence of the sight line is the resultant of component movements in each plane.

To derive elevation and azimuth signals proportional to the angles between datum line 15 and the components of axis 16 in the elevation and azimuth planes, elevation and azimuth pickoffs 21 and 22 are provided; these may conveniently be of the capacitive kind, co-operating with the surface of dome 12 as suggested in the drawing. Owing to the inertial action of the gyro, the measurements of these angles, as represented by the signals from the pickoffs, are space smoothed.

The front face of gyro wheel 11 has a mirror 23 which forms part of an optical display system—including also a fixed mirror 24, a lens 25, and a transmitting reflector 26—which provides the pilot with a head-up display at infinity of an image of a graticule 27 illuminated by a lamp 31. This image, 27[1], which constitutes the actual aiming mark of the sighting head defines the line of sight 32 from the pilot to the ground ahead at an angle of depression from the flight line 33. This optical system is such that the gyro spin axis 16 is always parallel to the sight line 32.

From the above explanation of the principle of the invention, it will be apparent that in order to constrain the gyro to stabilise the aiming mark 27¹ on the ground ahead, it is necessary to feed coils 17 and 18 with control signals proportional to $\phi_v$ and $\phi_h$ having the values stated in Equations 8 and 10. As these equations were derived for the vertical and horizontal planes whereas the planes of elevation and azimuth defined by the gyro field system rotate about the fore-and-aft line as the aircraft rolls, roll resolvers are necessary to convert from one system of orthogonal planes to the other the signals passing between the gyro apparatus and the rest of the bombsight equipment now to be described.

The signal $\phi_v$ is derived in a vertical plane computer 34. Of the three other quantities of Equation 8, $\theta_v$ is derived from the elevation and azimuth signals supplied respectively by pickoffs 21 and 22 by way of roll resolvers 35. As the elevation signal is proportional to the angle in the elevation plane between the spin axis and the datum line 15, which is coincident with the fore-and-aft line of the aircraft, and as $\theta_v$ is concerned with the line of flight rather than the fore-and-aft line, it is necessary to correct the elevation signal by subtracting from it the elevation drift angle $\theta_0$—that is, the angle between the fore-and-aft line and the flight line—prior to resolution. This is effected by deriving in an elevation drift setting control stage 36 a signal proportional to $\theta_0$ (which is manually adjustable to suit different values of that angle) and subtracting it from the elevation signal in a stage 37. The azimuth signal and the corrected elevation signal may be designated $\theta_a$ and $\theta_e$.

As the time constant T of the gyro is known, its value is preset in the computer.

A signal proportional to the quantity K is derived under manual control from a rate-control stage 41.

The signal $\phi_h$ is derived in a horizontal-plane analogue computer 42 in accordance with Equation 10. Signals $\phi_v$ and K are applied as two of the inputs. Of the other two terms, a signal proportional to $S_c/S$ is derived under manual control from a drift setting stage 43. A signal proportional to the term $(t-M)$ is derived in a ballistic computer 44 from signals $\theta_v$, K, a signal proportional to the ground speed S, and a signal dependent on the air density. To the signal $\phi_h$ thus derived by stage 42 is added the additional term $S_c/S$ (from stage 43) to correct for wind drift.

In order to allow the pilot to raise the aiming mark towards the target without disturbing its stabilisation, arrangements are made for adding to the signal $\phi_v$ a supplementary signal $\phi_v^1$ derived under manual control in an aiming-mark control stage 45. To avoid disturbing the stabilizing action of the gyro, the control of stage 45 is heavily spring-loaded so that the release of the control on attaining the desired new position of the aiming mark instantly discontinues the insertion of this supplementary signal.

Signals $\phi_v$ and $\phi_h$, after roll-resolution in a stage 46, are applied to the elevation and azimuth trail coils 17 and 18. For the reason already indicated, it is necessary to reinsert the signal $\theta_0$ in the elevation component and this is effected in a stage 47.

Ballistic computer 44 is also designed to derive a bomb-release signal in accordance with the ballistic characteristics of the bomb to be used—and other ballistic data such as the air density—and from the instantaneous values of $\theta_v$ and the ground speed S. The latter may be estimated from the air speed (as indicated by part of the aircraft's normal instrument equipment) and from information as to the probable wind conditions over the target as given to the pilot before take-off. It is found in practice that the accuracy of bomb-aiming is not usually affected much by such differences between ground speed and air speed as are normally met with. Taking the simplest case of a bomb falling freely in vacuo, so that $M=t$, it will be seen from FIG. 1 that if P is the correct point for release, $\tan \theta_v = D_v/St$. From the mechanics of the free fall, $D_v = \frac{1}{2}gt^2$. On combining these equations to eliminate $t$ and replacing D by $S/K$ we get $$S \tan^2 \theta_v = g/2K$$

Of these terms, g and K have been preset. Thus the computer acts by continuously deriving the critical value of $\theta_v$ (in dependence on the value of S) which is required at bomb release if the bomb is to hit the target, and delivers the release signal as soon as that value becomes equal to the measured value.

Corrections for air friction (causing $t$ to differ from M), wind drift, and other factors are applied in known manner.

The release signal is applied over a lead 48 to a suitable release equipment 49 which on receipt of the signal releases the bomb. Arrangements are made so that the mechanism is armed by the pilot to ensure that the bomb is dropped only on the target and not on any other ground object on which the mark may have been stabilised.

The ballistic characteristics of the bomb may be included in the computer as a data store which can be changed to suit the type of bomb (including retarded bombs) to be used, the rest of the computer remaining unchanged.

In operation, the term $\theta_0$ may be preset before take-off, or it may be controlled automatically by an air-stream detector or other instrument in the aircraft. Minor adjustments may also be made by the pilot according to the circumstances of the particular operation.

When flying to engage a target, the pilot first stabilises the aiming mark on any conveniently identifiable object on the ground ahead. This he does by first adjusting K to stabilise the mark in the direction of flight. If there is no cross component of wind, the mark will remain on that object. If however there is a cross wind, the mark after being thus stabilised in the direction of flight will drift across the track owing to the angular displacement of the craft in azimuth due to its having to head into the wind. The pilot corrects this drift by adjusting the drift-setting control stage 43. This last correction automatically gives him the horizontal pass distance $D_h$. The corresponding vertical pass distance $D_v$ is the height at which these adjustments were carried out, the pilot having selected this height to suit the particular type of bomb carried.

With the bombsight this fully stabilised the pilot can adjust stage 45 to raise the aiming mark to the target as soon as the target comes into view, and provided that he maintains the height $D_v$ and groundspeed S at the values they possessed during the stabilising process and turns the craft in azimuth to align the mark with the target the mark will remain stabilised on the target in the directions both along and across the track. The pilot then operates the control which arms the bomb release mechanism and thereafter takes no further action except to fly so as to maintain the aiming mark on the target. Even if the target should eventually disappear—under the nose of the aircraft, say—the full stabilisation will be maintained provided that the pilot maintains a straight and level course during the last few seconds before the bomb is automatically released by the signal delivered by the ballistic computer.

Should the pilot wish to alter his height (within the range suited to the bomb) or his air speed, he can do so because restabilising by means of control 41 can be very rapidly effected without distracting his attention from watching the ground ahead where it is in registration with the image at infinity of the aiming mark 27¹.

Should the pilot find during the bomb run that the mark tends to drift off the target in the direction across the track, he corrects this by suitably adjusting his course in azimuth. Should the mark drift off along the track, he can correct this either by adjusting his height or by adjusting control 41 as above described.

Where the aircraft carries a navigator, he may be provided with a telescope or television camera of high magnification (and therefore a narrow field of vision) controlled by a servo system to follow the position of the aiming mark. The pilot operates the bombsight controls as above described to stabilise the aiming mark in the general direction of a ground object. With the object thus brought into his narrow field of vision, the navigator can readily identify a much smaller object than is perceptible to the pilot. Having done so he takes over the control of the bombsight and adjusts K to stabilise the mark in the direction along the track. To cause it to be stabilised in the cross direction he instructs the pilot to alter the aircraft's course appropriately in azimuth; this the navigator may conveniently do by adjusting a marker located in the pilot's field of view so that by altering the course flown so as to bring the aiming mark onto the marker the pilot stabilises the mark in the cross direction.

If in either of the above embodiments it is more convenient to locate the gyro apparatus in a remote position, the aiming mark may be derived from a bright cathode-ray tube controlled in the X and Y scans from pickoffs on the gyro, with the tube display projected into the pilot's field of view in head-up form at infinity.

In the above descriptions it was assumed for convenience that the attack was being made whilst the craft was flying on a course parallel to the ground. Attacks may also be made in a diving or climbing manoeuvre, provided only that the aircraft flies straight, that is, with constant pass distance from the target in a vertical plane. Such an attack has the disadvantage of precluding the stabilisation of the mark on some selected point in advance of the target, since the changing height prevents the presetting of the value of K. Stabilisation thus has to be effected with the mark aligned on the target itself. The dive or climb angle has to be supplied to the ballistics computer, conveniently from a vertical reference gyro, or preset if the angle is known and maintained constant.

A bombsight in accordance with the invention thus has the particular advantage of facilitating a low-level bomb attack at a high speed. This it does by enabling the pilot to preset the equipment—by stabilising the mark as described—both quickly and simply in accordance with his plan of attack well in advance of the actual engagement, thereby allowing him to carry out the bomb run itself without having to do appreciably more than is necessary to keep the craft on a straight course at the speed and with the pass distance previously selected.

What I claim is:
1. An aircraft bombsight including
   (a) a sighting head for viewing the ground ahead of the craft against a head-up aiming mark which defines a sight line,
   (b) mark-precessing means including
       (i) measuring apparatus for continuously deriving a smoothed measured quantity dependent on the angle between the flight line of the craft and the component of the sight line resolved in the vertical plane, including an eddy-current gyro for so controlling the aiming mark that the sight line is rotated with respect to a datum line of the craft in each of the planes of elevation and azimuth as hereinbefore defined in dependence on the rotation with respect to that datum line of the gyro spin axis resolved in those planes,
       (ii) elevation and azimuth trail coils for applying eddy-current drag to the gyro to deflect its spin axis in those planes,
       (iii) pickoffs for deriving elevation and azimuth electrical signals from the gyro proportional to the angles between the datum line and the components of the spin axis resolved in those planes respectively,
       (iv) analogue computer stages for continuously solving the equations:

$$\phi_v = \theta_v + KT \sin^2 \theta_v \quad (a)$$

$$\phi_h = (S_c/S) K(t-M) \phi_v \quad (b)$$

wherein each angular term is represented by an electrical signal, $\theta_v$ is the angle between the datum line and the spin axis resolved in a vertical plane containing the flight line, the signal which represents that angle being derived from the pickoffs, K is a term which is manually adjustable in value, T is the time constant of the gyro as hereinbefore defined, $S_c$ and S are the cross wind speed and the ground speed of the craft respectively, and $t$ and M are the computed times of bomb flight and of the craft's flight from the bomb release point to the pass point vertically above the target as determined in known manner from the characteristics of the bomb,
       (v) means for correcting the computed signal $\phi_h$ for wind drift by adding the quantity $S_c/S$,
       (vi) roll resolvers for resolving the signal $\phi_h$ after such correction and the computed signal $\phi_v$ into said planes of azimuth and elevation, and
       (vii) connections for applying the last-mentioned signals to said trail coils after such resolutions, thereby causing the gyro to precess,
   (c) mark-stabilising means operable by the pilot of the craft whilst viewing the ground ahead against the aiming mark to adjust the value of the term K so as to stabilise the aiming mark on a fixed point on the ground ahead of the craft whilst the craft is flying a straight course parallel to the ground,
   (d) mark-transferring means for adjusting the value of $\phi_v$, thereby allowing the aiming mark when so stabilised to be transferred to coincide with the target, on which the mark remains stabilised,
   (e) a ballistics computer for deriving in dependence on the ground speed S the critical value of $\theta_v$ corresponding to the correct instant for releasing the bomb to hit the target whilst the craft is flying with the aiming mark stabilised on the target, and
   (f) release equipment for supplying a signal to release the bomb when the measured value of $\theta_v$, as derived from the pickoffs, reaches the computed critical value.

2. An aircraft bombsight including a sighting head for viewing the ground ahead of the craft against a head-up aiming mark which defines a sight line, mark-precessing means operative as the craft approaches a target for automatically and continuously precessing the aiming mark to rotate the sight line with respect to the flight line of the craft so that in each of the horizontal and vertical planes which contain the flight line the ratio of the angular velocity of the component of the sight line resolved in that plane to the square of the sine of the angle between that component and the flight line is controllable, mark-stabilising means operable by the pilot of the craft whilst viewing the ground ahead aganist the aiming mark for controlling each of said ratios to stabilise the aiming mark on a fixed point on the ground ahead of the craft whilst the craft is flying a straight course parallel to the ground, mark-transferring means for transferring the aiming mark when so stabilised to cause the mark to coincide with the target, on which the mark remains stabilised, measuring apparatus for continuously deriving a smooth measured quantity dependent on said angle between the flight line and said component of the sight line resolved in the vertical plane, a ballistics computer for deriving the critical value of said quantity corresponding to the correct instant for releasing the bomb to hit the target whilst the craft is flying with the aiming mark stabilised on the target, and release equipment arranged to supply a signal to release the bomb when the measured value of said quantity reaches the computed critical value, said mark-precessing means including an eddy-current gyro arranged to control the aiming mark so that the sight line is rotated with respect to a datum line of the craft in each of the planes of elevation and azimuth as hereinbefore defined, such rotation being in dependence on the rotation with respect to that datum line of the gyro spin axis resolved in those planes, elevation and azimuth trail coils for applying eddy-current drag to the gyro to deflect its spin axis in those planes, pickoffs for deriving elevation and azimuth electrical signals from the gyro proportional to the angles between the datum line and the components of the spin axis resolved in those planes respectively, analogue computer stages for continuously solving the equations:

$$\phi_v = \theta_v + KT \sin^2 \theta_v \qquad (a)$$

$$\phi_h = (S_c/S)K(t-M)\phi_v \qquad (b)$$

where each angular term is represented by an electrical signal, $\theta_v$ is the angle between the datum line and the spin axis resolved in a vertical plane containing the flight line and the signal which represents it is derived from the pickoffs, K is a term which is manually adjustable in value by said mark-stabilising means, T is the time constant of the gyro as hereinbefore defined, $S_c$ and S are the cross wind speed and the ground speed of the craft respectively, and $t$ and M are the computed times of bomb flight and of the craft's flight from the bomb release point to the pass point vertically above the target as determined in known manner from the characteristics of the bomb, said mark-transferring means being arranged to adjust the value of $\phi_v$, means for correcting the computed signal $\phi_h$ for wind drift by adding the quantity $S_c/S$, roll resolvers for resolving the signal $\phi_h$ after such correction and the computed signal $\phi_v$ into said planes of azimuth and elevation, and connections for applying those signals to said trail coils after such resolutions, thereby allowing the aiming mark to be stabilised on a point on the ground as aforesaid by adjustment of the term K, the ballistics computer being arranged to determine the correct instant to release the bomb by computing the critical value of the signal $\theta_v$ in dependence on the ground speed S.

3. A bombsight as claimed in claim 2 wherein said analogue computer stages include an elevation drift setting control stage for correcting the said elevation signal by subtracting from it a signal $\theta_0$ proportional to the elevation drift angle in that plane, roll resolvers to convert the azimuth signal and the corrected elevation signal into the signal $\theta_v$, a vertical-plane computer to solve equation (a) for $\phi_v$ in dependence on the signal $\theta_v$, the mark-stabilising means being in the form of a rate-control stage to supply a signal to represent K at a value which is manually adjustable, and the quantity T being preset, a stage for deriving from the signals $\theta_v$ and K and a signal proportional to the quantity S said quantities $t$ and M, a horizontal-plane computer for solving equation (b) for $\phi_h$ in dependence on the computed value of $\phi_v$, an azimuth drift setting control stage being provided to supply the ratio $S_c/S$, said mark-transferring means being in the form of an aiming mark control stage which allows adjustment of signal $\phi_v$ by adding a signal $\phi_v^1$, and said means for correcting the signal $\phi_h$ being in the form of connections from said azimuth drift control stage, and arrangements for adding to the resolved signal applied to the elevation trail coils the signal $\theta_0$ from the elevation drift control stage.

References Cited

UNITED STATES PATENTS

| 2,546,145 | 3/1951 | Boonshaft | 89—1.5 X |
| 3,034,116 | 5/1962 | Shelley | 33—46.5 X |

FOREIGN PATENTS 578,958  7/1946  Great Britain.

SAMUEL W. ENGLE, *Primary Examiner.*

BENJAMIN A. BORCHELT, *Examiner*